United States Patent [19]

Dietrich et al.

[11] Patent Number: 6,063,471
[45] Date of Patent: *May 16, 2000

[54] HEAT INSULATING BODIES

[75] Inventors: Karl Werner Dietrich, Odenthal; Heinz Thomas, Leichlingen; Hanns-Immo Sachs, Leverkusen, all of Germany

[73] Assignee: Bayer Aktiengesellschaft, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/836,908
[22] PCT Filed: Oct. 23, 1995
[86] PCT No.: PCT/EP95/04147
    § 371 Date: Apr. 25, 1997
    § 102(e) Date: Apr. 25, 1997
[87] PCT Pub. No.: WO96/14207
    PCT Pub. Date: May 17, 1996

[30] Foreign Application Priority Data

Nov. 4, 1994 [DE] Germany .............................. 44 39 328

[51] Int. Cl.$^7$ ........................................................ B32B 1/06
[52] U.S. Cl. .................................. 428/69; 428/71; 428/76; 52/406.2
[58] Field of Search ............................... 428/69, 76, 71; 156/94; 52/406.2

[56] References Cited

U.S. PATENT DOCUMENTS

| | | | |
|---|---|---|---|
| 4,482,597 | 11/1984 | Smith | 428/166 |
| 4,529,638 | 7/1985 | Yamamoto et al. | 428/69 |
| 4,668,555 | 5/1987 | Uekado et al. | 428/69 |
| 4,726,974 | 2/1988 | Nowobilski et al. | 428/69 |
| 5,268,209 | 12/1993 | Hunt | 428/34.3 |
| 5,273,801 | 12/1993 | Barry et al. | 428/69 |
| 5,364,577 | 11/1994 | Cur et al. | 264/69 |

FOREIGN PATENT DOCUMENTS

| | | |
|---|---|---|
| 2110394 | 10/1993 | Canada . |
| 1308468 | 2/1973 | United Kingdom . |

*Primary Examiner*—Alexander Thomas
*Attorney, Agent, or Firm*—Joseph C. Gil; Noland J. Cheung

[57] ABSTRACT

A heat-insulating body comprises
a) a porous pressed molded part having a bulk density of from 50 to 350 kg/m$^3$, preferably of from 100 to 250 kg/M$^3$, which has been obtained by comminution of plastics foam to powder or flakes, and binding of the power or of the flakes using a binder with simultaneous or subsequent pressing with shaping, and
b) a film covering the pressed molded part,
with the film which covers the pressed molded part having been evacuated and then hermetically sealed.

10 Claims, No Drawings

HEAT INSULATING BODIES

BACKGROUND OF THE INVENTION

The production of heat-insulating bodies (vacuum panels) from a porous material and a gas-tight film covering it all over, with the "hollow space" formed by the porous material being evacuated, is known. The porous material may consist either of a porous bulk material or else of a rigid foam. The film usually consists of combinations of several layers, with various objects, such as that of providing a diffusion barrier to different gases and giving mechanical strength, being fulfilled by the different layers.

Most marketable vacuum panels have a core of porous bulk material, usually based on silicates.

In EP-B 188 806 rigid polyurethane-based (PU) foams are described as filling material for vacuum panels. The problem with this process is that of achieving the required open-cell structure by precise selection of formulation and by maintaining particular processing variables, since PU rigid foams are predominantly closed-celled. Another problem with the use of PU rigid foams as supporting material for vacuum panels is the evolution of volatile constituents such as amines, blowing agents and possibly also monomers.

An advantage of rigid PU foams as compared with porous bulk materials, on the other hand, is their exact dimensioning as the finished vacuum panel, as well as their exact dimensional accuracy.

Surprisingly, it has now been found that an excellent supporting material for vacuum panels can be economically produced by mixing with binders the plastics foam powder or plastics foam flakes, which arise, for example, during the recycling of waste foams, preferably from refrigerator insulation, and processing the mixture with the use of pressure and optionally temperature to form moulded products having a bulk density of from 50 to 350 kg/m$^3$, preferably of from 100 to 250 kg/m$^3$. Here moulded products, for example slabs, having a fine pore structure and high strength and dimensional accuracy are obtained.

SUMMARY OF THE INVENTION

The invention therefore provides a heat-insulating body, comprising:

a) a porous pressed moulded part having a bulk density of from 50 to 350 kg/m$^3$, preferably of from 100 to 250 kg/m$^3$, which has been obtained by comminution of rigid plastics foam to powder or flakes, and binding of the powder or of the flakes using a binder, with simultaneous or subsequent pressing with shaping and b) a film covering the pressed moulded part, with the film which covers the pressed moulded part having been evacuated and then hermetically sealed.

DETAILED DESCRIPTION OF THE INVENTION

According to the invention it is preferred that the plastics foam to be comminuted is a rigid polyurethane foam, the plastics foam to be comminuted is a recycling material, preferably a rigid polyurethane foam, from the process of recycling old refrigerators, foam powder or the foam flakes have a particle size of from 0.01 to 5 mm, preferably of from 0.1 to 2 mm, the binder used for the production of the pressed moulded part is a diisocyanate or polyisocyanate, (preferably mixtures of diphenylmethane diisocyanates and polyphenylpolymethylene polyisocyanates), the foam powder or the foam flakes or the pressed moulded part has been freed from volatile constituents by tempering at temperatures of from 50 to 250 °C., preferably of from 100 to 150° C., optionally at low pressure, prior to further processing, the covering film used is a multilayer film, preferably a polyethylene/aluminium film or polyethylene/polyvinyl alcohol film. A covering layer may optionally also be a gas-tight, rigid plate.

All known films, for example, combination films, which are also used in the production of commercially available vacuum panels are suitable for the vacuum panel produced according to the invention. Examples which may be named are a combination of polyethylene film with polyvinyl alcohol film or of polyethylene film with aluminium film.

All rigid plastics foams, preferably polyurethane foams, are suitable as foams to be used according to the invention. Although the films used for vacuum panels already possess a high gas density, they are nevertheless not gas/vapour barriers. In particular penetrating water vapour can impair the vacuum and therewith the heat-insulating properties of the vacuum panel. To avoid this, according to the invention vapour-absorbing substances, for example, those based on silicate or aluminium, can be used in quantities of from 5 to 50 wt. %, preferably of from 10 to 25 wt. %. It has been found, however, that a PU sandwich panel according to the invention also already possesses a very strong capacity to absorb water.

Suitable binders are, for example, the diisocyanates and/or polyisocyanates referred to in DE-AS 1 911 645.

The comminution of the rigid foam can be carried out, for example, by milling, grinding or by picking to pieces. Optionally larger pieces of foam can also be crushed or pounded.

Another advantage of the vacuum panels according to the invention is that the pressed moulded part can be prefabricated or that optionally vacuum moulded parts can also be produced in addition to vacuum panels.

The foam slabs can, for example, be cut when upright prior to the covering with film and evacuation, or appropriate indentations can be milled out for the assembly of switches, wiring or ducts.

The fineness of the porosity can according to the invention be adjusted on the one hand by the intensity of the milling process and on the other hand by the fineness of the cell structure of the foam to be milled.

The pressing with shaping is carried out in a manner known per se at increased pressure (for example, 1.5–20 bar) and optionally at elevated temperature (for example, 50–250° C.). In one variant of the process according to the invention, after the evacuation the substrate can again be wholly or partly filled with a gas possessing a low thermal conductivity (for example, xenon)

EXAMPLE 580 g of a PU rigid foam powder from a refrigerator recycling plant is evenly mixed with 20 g of water and 58 g of a polyisocyanate mixture comprising diphenylmethane diisocyanates and polyphenylpolymethylene polyisocyanates (Desmodur VP® PU 1520 A20; Bayer AG) by means of a Lödige ploughshare mixer having 2 nozzles. From this mixture a shaped body of 400×400 mm in size is formed in a holding block, evenly compacted and subsequently pressed to 20 mm in a laboratory press at a pressure of 5 bar and at a temperature of 120° C. for 8 minutes, using a timekeeping programme.

A porous 20 mm slab having a bulk density of 200 kg/m³ is thus obtained. The slab is heated to 120° C. for approximately 2 hours, in order to free it from all volatile constituents.

The slab is covered with a film consisting of the layers polyethylene/polyvinyl alcohol/polyethylene and evacuated to 0.001 bar. Under vacuum the edges of the film become sealed. The vacuum panel thus obtained has a thermal conductivity λ of 9 m W/° Km, measured by the heat-flow method.

We claim:

1. A heat-insulating body, comprising:
   a) a porous pressed molded part having a bulk density of from 50 to 300 kg/m³, which has been obtained by comminution of rigid plastics foam to powder or flakes, wherein the foam powder or flakes have a particle size of from 0.1 to 2 mm, and binding of the powder or the flakes using a binder, with simultaneous or subsequent pressing with shaping and
   b) a film covering the pressed molded part, with the film which covers the pressed molded part having been evacuated and then hermetically sealed, wherein said pressed molded part has been freed from volatile constituents by tempering at temperatures of from 50 to 250° C. and optionally, at a low pressure.

2. The heat-insulating body according to claim 1, wherein the plastics foam to be comminuted is a polyurethane foam.

3. The heat-insulating body according to claim 1, wherein the plastics foam to be comminuted is a recycling material, which originates from the process of recycling old refrigerators.

4. The heat-insulating body according to claim 1, wherein the binder used for the pressed molded part is a diisocyanate or polyisocyanate.

5. The heat-insulating body according to claim 1, wherein the covering film used is a multilayer film.

6. The heat-insulating body according to claim 5, wherein said covering film is a polyethylene/aluminum film.

7. The heat-insulating body according to claim 5, wherein said covering film is a polyethylene/polyvinyl alcohol film.

8. The heat-insulating body according to claim 1, wherein said bulk density of said porous pressed molded part has a density of from 100 to 250 kg/m³.

9. The heat-insulating body according to claim 3, wherein said recycling material is a rigid polyurethane foam.

10. The heat-insulating body according to claim 1, wherein said temperature ranges from 120 to 200 °C.

* * * * *